Patented Aug. 26, 1952

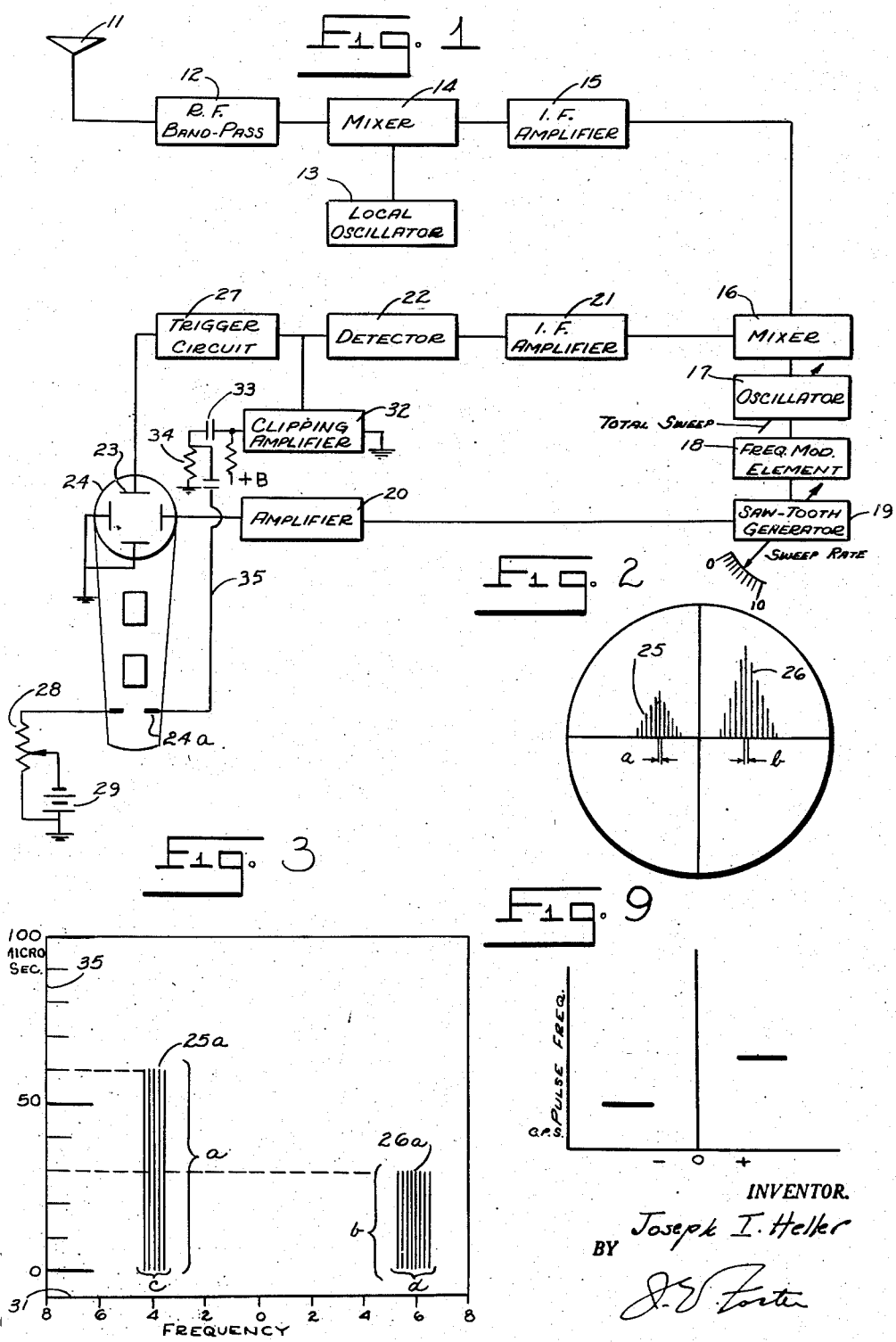
Aug. 26, 1952 — J. I. HELLER — 2,608,652
PULSE ANALYZING METHOD AND SYSTEM
Filed Jan. 31, 1946 — 2 SHEETS—SHEET 1
INVENTOR.
Joseph I. Heller
BY

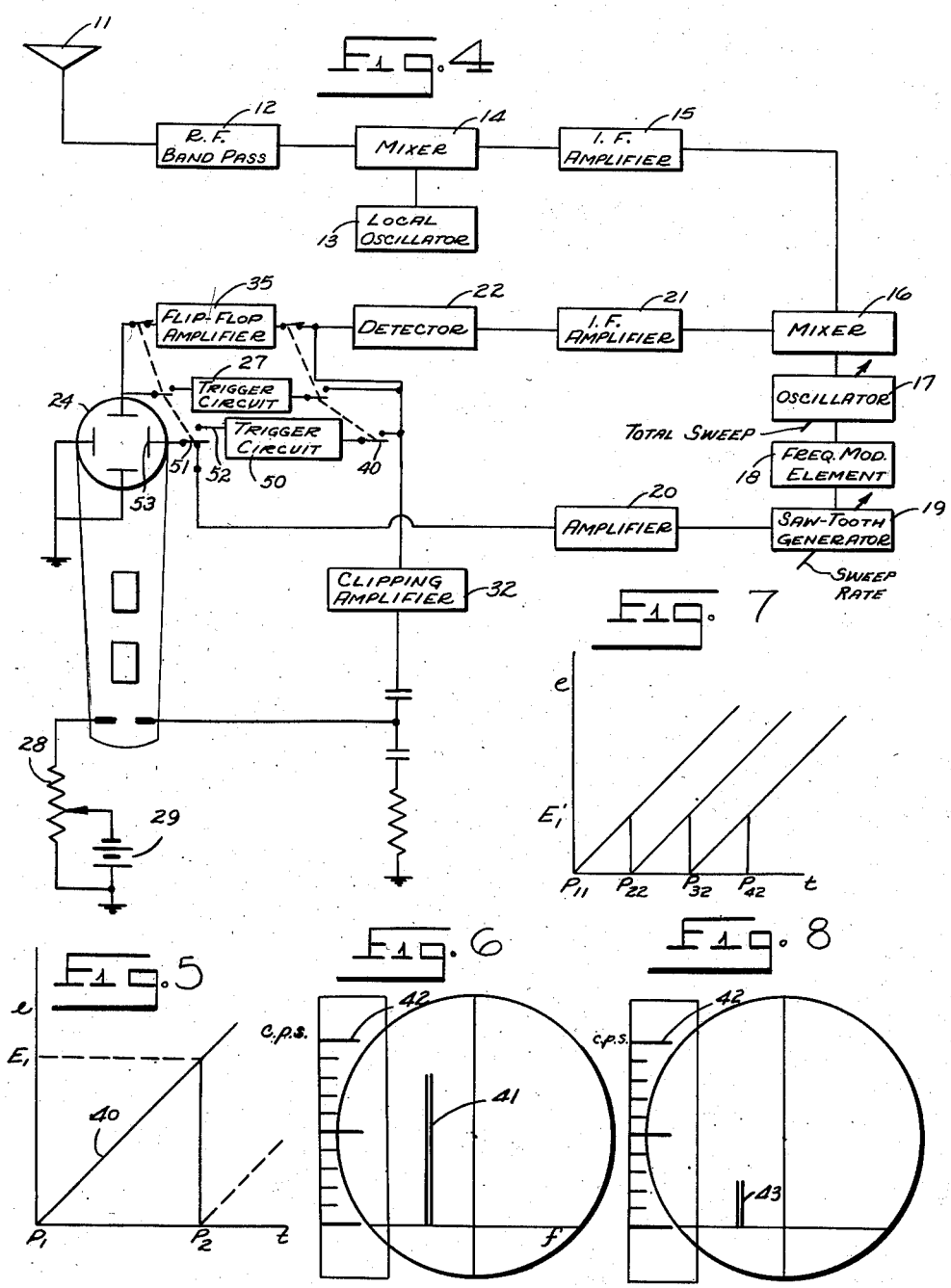

2,608,652

UNITED STATES PATENT OFFICE 2,608,652

PULSE ANALYZING METHOD AND SYSTEM

Joseph I. Heller, Brooklyn, N. Y., assignor, by mesne assignments, to Marcel Wallace, doing business as Panoramic Laboratories, East Port Chester, Conn.

Application January 31, 1946, Serial No. 644,512

7 Claims. (Cl. 250—29)

This invention relates to wave analyzing systems, and particularly to a panoramic system for detecting and analyzing pulses.

One object of this invention is to provide a panoramic system for searching through a wide band frequency spectrum to locate any pulse-modulated signals within that band, and then automatically to show the frequency of each pulse-modulated signal, and to indicate the duration and intensity of each pulse.

Normally, in the use and reception of pulse modulated signals, the signals are picked up on a receiver tuned to the wave frequency of the pulse carrier. The signals are amplified in the usual manner, either by means of a tuned radio frequency or superheterodyne amplifier, and the pulses are then detected and amplified by video amplifiers. After detection and amplification of the pulses they are analyzed by suitable devices to determine their duration in microseconds and their repetition rates in cycles per second. The frequency of the pulse carriers is determined by tuning of the receiver.

Present systems are limited in that the data required in connection with pulses is given for a signal of only one frequency at a time, corresponding to the carrier frequency to which the system is tuned. The necessary tuning adjustment and measurement of the pulse receiver and measurement of pulse characteristics must therefore be made for each signal frequency in turn, with consequent loss of time in the search through the frequency spectrum for pulse signals.

A primary object of this invention is to provide a system whereby the repetition rates of pulses occurring as pulsed carriers in a wide band of the frequency spectrum are directly indicated together with their respective carrier frequencies.

Another object of this invention is to provide a system whereby the respective frequencies of pulsed carriers in a wide band spectrum are directly indicated, so that rapid adjustment of the equipment may be made to study the repetition rate of any selected one of the pulse signals.

This invention utilizes certain methods of panoramic reception and indication of signals throughout and within a selected range of the frequency spectrum. For a further understanding of the nature of the panoramic methods and their application to this invention, reference is made to Patent No. 2,279,151, issued April 7, 1942, to Marcel Wallace, for Panoramic Radio Receiving System; Patent No. 2,312,203, issued February 23, 1943, to Marcel Wallace for Radio Beacon and Panoramic Reception System; Patent No. 2,378,604, issued June 19, 1945, to Marcel Wallace for Radio Altimeter and Panoramic Reception System; Patent No. 2,381,940, issued August 14, 1945, to Marcel Wallace and Horace G. Miller for Method and Apparatus for Simultaneous Aural and Panoramic Radio Reception.

As explained in the above identified patents, a superheterodyne receiver of either a single-conversion or double-conversion receiving system may be used. The entire frequency band that is received and passed by the input circuit of the receiving system is scanned and all of the modulating signals imposed upon the high frequency carriers within that band are detected in succession, and supplied in succession to a cathode ray oscillograph, and there indicated as signal pulses, spaced along the baseline trace on the display surface of the oscillograph in such manner as to indicate the frequency spacing of the carrier waves on which the pulses are modulated.

As the frequency band that is received by the receiver input circuit and indicated on the oscillograph display surface may be relatively wide, each pulse is relatively narrow at its base where it joins the baseline trace. Such indicated width of a pulse at its base will be, in fact, a function of the scanning speed rather than a function of the actual duration of the pulse, as is explained in some detail in Patent 2,381,940, particularly with respect to Fig. 4 of that patent.

The present invention, instead of merely indicating the pulse at its normal location along the frequency scale and as a deviation of the baseline trace, segregates each modulating pulse, and, in effect, rotates it physically through an angle of 90° so that the effective baseline of each pulse can be enlarged and extended to permit its extent or duration to be measured along the full length dimension of the vertical scale that is available on the display screen of the oscillograph.

Another object of this invention, therefore, is to provide a system wherein a measurement of pulse duration may be indicated on the screen of an oscillograph at the location on a frequency scale corresponding to the frequency of the carrier on which the pulse is imposed.

The manner in which the system operates may be appreciated upon reference to the accompanying drawings, in which:

Figure 1 is a schematic block diagram of this system, illustrating the various functions which enter into the operation of the system in its entirety;

Figure 2 is a schematic view of a cathode ray tube display surface showing how pulse signals were shown on a frequency baseline in the prior art, represented by the patents referred to above;

Figure 3 is a schematic front view of the display surface of a cathode ray tube, in accordance with the present system, showing a frequency band in which two pulse signals occur;

Figure 4 is a block diagram of a system similar to the system of Figure 1, but modified to permit measurement and indication of pulse repetition time;

Figures 5 and 7 are graphs of two saw-tooth voltages of different illustrative rates of repetition;

Figures 6 and 8 are schematic views of the appearance of the display surface of the oscilloscope for the rates of Figures 5 and 7, respectively;

Figure 9 is a view of the display surface, as established by a different circuit, to show only the top values of the voltages of Figures 6 and 8.

In a preferred embodiment of the invention, and for purposes of example only, a double conversion heterodyne system is illustrated as the type of receiver utilized.

As shown in Figure 1, the equipment of the receiving circuit includes an antenna 11, a signal input circuit 12, a local oscillator 13, and a converter or mixer 14 for combining the frequencies transmitted by the input circuit 12 and the frequency generated by the local oscillator 13, to develop a first intermediate frequency that is fed to an I. F. amplifier 15. The amplified I. F. is then supplied to a second converter 16 which is also supplied with a sweep frequency from an oscillator 17 whose frequency is controlled by a frequency-modulating element 18, which in turn is controlled by the sawtooth voltage from a sawtooth generator 19.

The output of the second converter 16 is fed through an I. F. amplifier 21 to a detector 22, from which an output voltage corresponding to the pulse envelope of the received carrier is obtained. Amplifier 21 has a pass characteristic sufficiently wide to pass the pulses substantially without distortion.

Up to this point the system corresponds to the double conversion system for panoramic use as shown in one or more of the patents above referred to.

If the output of detector 22 were now applied to one pair of deflection plates 23 of an oscilloscope 24, the other deflection plates of which were energized by the saw-tooth voltage from a generator 19, pulses would be displayed as typical inverted V-shaped deflections 25 and 26 rising from the baseline at the zones corresponding to the frequencies of the carriers on which the pulses occur, as schematically indicated, for example, in Figure 2. The durations of the pulses would be as indicated at $a$ and $b$, and it would be difficult, if not impossible, to determine the pulse durations with any degree of accuracy because of the small dimensions involved.

The principle of the present invention, therefore, is to utilize the output voltage of the detector 22 in such manner as to provide a better indication of pulse duration. For that purpose, the output voltage of detector 22 is used to initiate operation of an auxiliary trigger circuit 27, and to drive a clipping amplifier 32 to supply a pulse of constant amplitude to the intensity grid of the cathode ray tube.

The auxiliary trigger circuit 27 produces a saw-tooth voltage which is applied to the vertical deflection plates of the oscilloscope. The time characteristics of the trigger circuit 27 are preferably made such that a pulse applied to the trigger circuit will immediately, and without delay, cause a sawtooth voltage to be generated. The amplitude of the sawtooth voltage is such as to enable utilization of the total screen area available in the vertical direction, while the slope of the sawtooth is made such as to provide sufficient time for the longest pulse width to be recorded. In other words, if the maximum pulse width to be measured is 100 microseconds, then 100 microseconds is ordinarily made the time for one complete cycle of sawtooth, and that time period is set up as the maximum reading on a vertical scale, against which the duration of the pulses will be measured. Once an operation of trigger 27 is initiated, the trigger will generate a saw-tooth voltage of maximum amplitude, independently of the duration or intensity of the initiating pulse. The saw-tooth voltage of trigger 27 is therefore sufficient to establish a deflection of the trace equal to the full length of the vertical scale, indicated in Figure 3, for example, as 100 microseconds, to provide sufficient time for the longest pulse width to be recorded. In other words, if the maximum pulse width to be measured is 100 microseconds, the time for one complete cycle of the sawtooth operation of trigger 27 is made long enough to permit the cathode ray spot to be on the screen for at least 100 microseconds.

In order to show the trace deflection on the display surface of the cathode ray tube 24 for only the duration of the pulse, the detected pulse from detector 22 is used to control the intensity of the cathode ray beam. Therefore, the grid or control electrode 24a of the cathode ray tube 24 is normally biased negatively, and that negative bias is changed to a positive value for the duration of the pulse. The negative bias is impressed on the grid from a suitable circuit, shown here schematically, for simple illustration, as a potentiometer 28 energized from a voltage source 29. The shift from the negative bias to a positive bias is effected by applying a fixed positive potential to the grid from the clipping amplifier 32. For simplicity, only the output circuit of the clipping amplifier 32 is shown, with the usual condenser 33 and load resistor 34. The amplifier constants should be arranged so conductor 35 from resistor 34 will supply a positive voltage to the control grid and thereby intensify the beam effect. The clipping amplifier 32 feeds a clipped pulse signal of constant amplitude to the control grid 24a of the cathode ray tube, so that all pulse signal traces indicated on the screen surface of the cathode ray tube are of uniform intensity visually even though the duration and the actual intensity or strength of the respective pulse signals may not be the same.

While the control grid 24a is negative, the trace is effectively suppressed. While the grid is positive the trace is bright. The grid 24a is kept positive so long as a detected pulse drives the clipping amplifier 32. The grid is therefore effective to establish a bright trace so long as the detected pulse exists, and the trace is therefore bright for only the duration of the pulse, in spite of the fact that the saw-tooth voltage from trigger circuit 27 on the vertical deflecting plate 23 continues for the full time constant of that trigger circuit 27.

The appearance of the display surface of the cathode ray tube 24 as controlled in accordance with the present invention is indicated schematically in Figure 3, for the two pulses 25 and 26 of Figure 2. In Figure 3 these same two pulses 25 and 26 are identified as 25a and 26a. The baseline duration a of pulse 25 of Figure 2 is now shown as the height a in Figure 3. Similarly, the duration b of pulse 26 of Figure 2 is shown as height b in Figure 3. By use of the entire height of the vertical sale 35 of Figure 3 for measuring pulse duration, a visual indication is available whose dimension is twelve to fifteen times the dimension available in the display of Figure 2. The calibrated frequency scale 31 along the baseline of Figure 3 is relative, and the central or zero line calibration corresponds to the frequency to which the input radio-frequency circuit is tuned by the local oscillator 13.

The calibrations on scale 31, either positive or negative, represent the frequency deviation from the tuning indication of the main RF receiver in Figure 1. The vertical duration calibrations 35 at the side of the viewing frame, Figure 3, may be directly calibrated in microseconds and the height of the signal indication corresponding to duration may then be immediately read off the calibrated scale.

A typical display on the display surface of a cathode ray tube, as it appears when the apparatus herein described is used, is shown in Figure 3, with the two pulse signals 25a and 26a. If the receiver is tuned, for example, to 100 megacycles, that frequency would correspond to the zero point on the base line in Figure 3, and the frequency of the carrier which is modulated by pulse 25a would be 100 megacycles minus the 4 megacycles shown, or 96 megacycles, and the pulse duration would be measured against the vertical scale 35 at the left, as sixty microseconds. Similarly, pulse 26a represents a pulse-modulated signal at a radio frequency of 106 megacycles with a pulse duration of thirty microseconds. In each case the displayed width of each pulse signal is proportional to its field strength, and in the indications as shown in Figure 3, pulse signal 26a is shown as having greater field strength than signal 25a.

Other signals may be displayed simultaneously on the screen of the cathode ray tube, and the displays would be similar to those described. In each case the radio frequency of the signal carrier would be indicated by the horizontal location of the display on the base scale 31, and the duration of each signal would be measured against vertical scale 35, while the relative pulse signal strength would be indicated by the width of the pulse, as by c or d.

Thus, the radio frequency, the time duration and the field strength of a pulse signal are directly indicated for every pulse signal in the frequency band.

Another characteristic of pulse signals which is of interest is its repetition rate or period. Such repetition rate or period may be measured in several different ways.

In accordance with a first method, illustrated in Fig. 1, the receiver is tuned by the first local oscillator 13 so that the signal whose repetition period is to be measured is displayed at the center or zero position of the screen, as in Fig. 3, corresponding to zero frequency deviation. The oscillator 17 is then adjusted to zero sweep and the sawtooth generator 19 is varied in frequency until only one pulse is seen on the screen. This will occur when the sawtooth generator 19 has a frequency that is equal to the repetition rate of the signal. The repetition rate or frequency can then be read directly from the calibration of the frequency-control, or adjusting, element of the saw-tooth generator 19. And in the same manner, any other signal appearing on the screen under full frequency modulation conditions can be brought to the center of the screen and its pulse repetition rate quickly measured. Since the display surface shows all of the pulse signals that may require investigation, considerable time is saved in the tuning of the receiver to the particular pulse that is to be measured.

For a second method of pulse repetition time measurement, the circuit of Fig. 4 is used, with the switches in the circuits to the cathode ray tube 24 thrown to their upper positions. Trigger circuits 27 and 50 are thus connected to the vertical and the horizontal deflection plates respectively of the cathode ray tube 24. The flip-flop amplifier 35 is not connected for this operation. The output voltage of the detector 22 is now fed through a switch 40 to the trigger circuit 50, the output of which is then fed through a switch 51 at its upper position 52 to the horizontal plate 53 on the cathode ray tube 24. In this position 52 of the switch 51, the amplifier 20, fed by the sawtooth generator 19, is disconnected from the cathode ray tube 24. The action of the circuit is then as follows: a voltage pulse from detector 22 starts the trigger 50 and initiates a sawtooth voltage wave which moves the spot horizontally across the screen. The rate of the sweep and its duration time is determined entirely by the timing constants of the trigger circuit 50 and not by the voltage pulse signal from the detector 22, since that voltage pulse signal merely initiates the sweep of the trigger circuit 50. If the next succeeding pulse emerging from detector 22 appears before the horizontal sweep due to trigger circuit 50 has completed its cycle, a second pulse will appear on the base line established by the trigger circuit 50 and the spacing on the screen of this second pulse from the first pulse will be indicative of the repetition time, since the first pulse that initiated the sweep will also still be present as a vertical deflection in response to the action of the trigger circuit 27.

Both the first and second methods just described require that the signal being measured for pulse repetition rate be moved to the center of the screen and that the sweep of the oscillator 17 and its modulator 18 be reduced to zero.

The third method may also be explained by reference to Figure 4. For this method, consider all the switches to the cathode ray tube circuits to be in their lower positions. Trigger circuits 27 and 50 are disconnected, and the flip-flop amplifier 35 is substituted, and amplifier 20 is restored. The circuit is otherwise similar to that shown in Figure 1.

The first pulse of a train emerging from detector 22 energizes the flip-flop circuit 35 and causes it to move to flip condition, at which a sawtooth output voltage is generated and impressed on the top vertical electrode of the cathode ray tube 24, resulting in the initiation of a vertical movement or deflection of the cathode ray beam spot. Intensification of the trace takes place at the same time due to energization of the cathode ray tube grid by the intensifier amplifier 32. The next succeeding pulse from detector 22 flops the circuit 35 back to its original condition, thereby effectively stopping the sawtooth voltage on the vertical deflection plate and terminating the intensified vertical line on the display screen of the tube 24 at a length proportional to the period of time between the two successive pulses of the same train from detector 22. How such flip-flop timing operates is further illustrated in Figure 5, in which line 40 represents the sawtooth voltage initiated by the first pulse beginning at an instant of time identified as P1 at the zero point of the co-ordinates. At point P1, the flip-flop circuit 35 flips to its flip condition, and remains thus until the next pulse re-energizes the flip-flop circuit 35 at time P2 to cause it to flop back to its original condition, and terminating the flip voltage at the value E-1. At that instant of time, designated as P2, when that second pulse arrives, the voltage along the line 40 will have been built up to a value equal to E-1. The sawtooth voltage 40 of Figure 5 will move the beam spot in a vertical line trace 41, as shown in Figure 6 to a height corresponding to E-1 in Figure 5. The movement of the spot on the display surface of the oscilloscope is thus controlled by voltage E-1, which in turn is controlled by the interval between pulses. The voltage such as E-1, which the sawtooth voltage is permitted to attain, is a measure of the time interval T of the flip-flop circuit condition. The repetition rate, or frequency, is equal to reciprocal of the time interval T. The vertical scale 42 which measures the height of movement of the spot as in path 41, may thus be calibrated directly to show the voltage E-1 reached on the sawtooth voltage curve 40; or directly to show the time interval T from P-1 to P-2; or inversely to show the repetition rate in cycles per second as a reciprocal of the time interval T involved.

In Figure 6 the scale is thus shown inversely calibrated, in cycles per second, increasing downward, according to smaller time intervals between successive pulses, for the carrier frequency being investigated.

In Figure 7 a graph similar to that in Figure 5 is shown, but in which the time intervals between successive pulses are shorter, as from P-11 to P-22.

The movement of the cathode ray beam spot is correspondingly shorter, as shown by the vertical trace 43 in Figure 8. The shorter trace 43 will indicate a higher repetition rate or larger number of cycles on the scale 42.

The constants of the flip-flop circuit 35 are arranged to allow the sawtooth voltage along the line 40, if not interrupted, to build up a time of duration equal to but not greater than the greatest time interval to be expected from the pulses to be investigated, so the flip-flop circuit will then automatically restore itself to initial conditions. The appearance of the signals under these conditions will be similar to that shown in Figure 6, representing pulse duration time, except that the vertical calibration may now read cycles per second.

The signals 41 and 43 in Figure 6 and Figure 8 would each show only one line on the screen if the sweep time of the saw-tooth generator 19 were short enough to permit only one flip-flop.

The sweep time is ordinarily sufficiently long, however, to permit several flip-flop operations during one sweep interval, so several vertical lines are shown, depending upon relationship between the repetition rate of the observed signals and the rate of sweep.

An alternative method of presenting the information given is in the arrangement of the circuit which does not use the sawtooth voltage directly, but which uses it in conjunction with a peaking circuit which will bring the spot to a certain vertical position depending upon the value of the flip-flop sawtooth at the instant of flop back to original position.

Such a system will result in the bar of light as an indication as shown in Fig. 9, instead of as vertical lines, as shown in Figures 6 and 8.

I claim:

1. In combination, a tunable wave energy receiver for wave energy pulses having each a wave frequency, a pulse duration, and having predetermined pulse separation times, a cathode ray tube indicator having means for generating a beam of electrons and a display surface responsive to impact by said beam of electrons to provide a visible indication, means for periodically tuning said receiver over a band of frequencies including each wave frequency of said pulses, means for deflecting said beam in a first direction in synchronism with said tuning, means responsive to a first received pulse for initiating deflection of said beam in a second direction, means for increasing said deflection progressively as a function of time, and means for terminating said deflection in response to a succeeding pulse.

2. The combination in accordance with claim 1 wherein is further provided means for deflecting said beam in said first direction as a function of time in response to certain of said pulses, and means for deflecting said beam in said second direction as a function of time separations between successive pulses, and means for alternatively disabling (1) said two last mentioned means and (2) said first mentioned means for deflecting and said means responsive to a first received pulse.

3. In combination, a tunable radio receiver for radio frequency pulses of various durations, a cathode ray tube indicator having means for generating a cathode ray beam, means for periodically varying the tuning of said receiver and for synchronously deflecting said cathode ray beam in a first direction, to provide a beam position corresponding with each value of tuning of said receiver, means comprising a trigger circuit responsive to each of said radio frequency pulses for deflecting said beam in a second direction for a time corresponding with a maximum duration of said each of said radio frequency pulses, and means for intensifying said cathode ray beam only during said each of said radio frequency pulses.

4. In a pulse duration analyzer, a source of pulse signal, a cathode ray tube indicator having means for generating a cathode ray beam, first means comprising a sawtooth generator for deflecting said cathode ray beam at a relatively constant rate in response to each of said pulses, and further means for increasing the intensity of said beam during deflection thereof by said means for deflecting and in response to and only during continuation of said each of said pulse signals.

5. In combination, a tunable wave energy receiver for wave energy pulses of random durations and at random frequency of wave energy within a predetermined spectrum of frequencies, a cathode ray tube indicator having means for generating a cathode ray beam, means for periodically varying the tuning of said receiver over said spectrum, means for deflecting said cathode ray beam in a first direction in synchronism with said tuning, to provide a beam deflection in said first direction for each value of tuning of said receiver, and means comprising a voltage wave generator responsive to each wave energy pulse by said receiver for providing a visible indication in a second direction having a length determined by duration of said pulse.

6. In combination, a tunable wave energy receiver for wave energy pulses at random durations and at random frequency of wave energy within a predetermined spectrum of frequencies, a cathode ray tube indicator having means for generating a cathode ray beam, means for periodically varying the tuning of said receiver over said spectrum, means for deflecting said cathode ray beam in a first direction in synchronism with said tuning, and means responsive to initiation of each of said pulses for initiating a constantly increasing deflection of said beam in a second direction and for a duration greater than the duration of any of said pulses, and means for intensifying said beam for the duration of each of said pulses only.

7. The combination in accordance with claim 5 wherein is further provided a trigger circuit responsive to initiation of each of said pulses for initiating a constantly increasing deflection of said beam in a second direction and responsive to termination of each of said pulses for terminating said deflection.

JOSEPH I. HELLER.

REFERENCES CITED

The following references are of record in the file of this patent:

UNITED STATES PATENTS

| Number | Name | Date |
|---|---|---|
| 2,178,074 | Jakel et al. | Oct. 31, 1939 |
| 2,185,693 | Mertz | Jan. 2, 1940 |
| 2,189,549 | Hershberger | Feb. 6, 1940 |
| 2,243,234 | Von Duhn | May 27, 1941 |
| 2,266,401 | Reeves | Dec. 16, 1941 |
| 2,355,363 | Christaldi | Aug. 8, 1944 |
| 2,381,940 | Wallace | Aug. 14, 1945 |
| 2,404,527 | Potapenko | July 23, 1946 |
| 2,424,349 | Cawein | July 22, 1947 |
| 2,481,045 | Schroeder | Sept. 6, 1949 |

OTHER REFERENCES

Art by Moulic, Electronic Industries, July 1944, pages 86–88.